3,678,010
VULCANIZED SILICON TERMINATED POLYMERS
George L. Brode, Bridgewater, N.J., assignor to Union Carbide Corporation, New York, N.Y.
No Drawing. Filed Dec. 22, 1969, Ser. No. 887,337
Int. Cl. C08g 17/14, 47/06
U.S. Cl. 260—75 T          8 Claims

ABSTRACT OF THE DISCLOSURE

A silicon terminated organic polymer comprising a carbonyl chloride terminated polyester prepolymer wherein the carbonyl chloride terminal groups have been reacted with an organosilicon compound to terminate, that is cap or endblock said polymers with organosilicon groups.

BACKGROUND OF THE INVENTION

This invention relates to vulcanizable silicon terminated organic polymers. More particularly this invention relates to room temperature curable silicon terminated organic polyester polymers having at least two ester linkages per polymer molecule.

The instant one component room temperature vulcanizable (hereinafter abbreviated as RTV) polymers of this invention have a decided advantage over multi-component RTV systems in that they do not suffer the drawbacks and difficulties encountered in on-sight mixing of viscous materials, often of different viscosities, which once mixed must be used quickly before they become unmanageable and wasted.

SUMMARY OF THE INVENTION

Broadly it is an object of this invention to provide one component vulcanizable silicon terminated organic polyester polymers having at least two ester linkages per polymer molecule. It is a further object of this invention to provide a vulcanizable silicon terminated organic polyester polymer which will cure to a cross-linked product upon exposure to atmospheric moisture and/or water comprising a system prepared from an carbonyl chloride terminated prepolymer containing at least two ester linkages per polymer molecule wherein the carbonyl chloride terminal groups have been reacted and capped with a functional organosilicon compound, having a reactive hydrogen atom capable of reacting with the carbonyl chloride terminal groups to produce functional silicon terminal end-blocking groups for said vulcanizable polymers.

More specifically, the vulcanizable silicon terminated organic polyester polymers of this invention are those having at least two ester linkages per polymer molecule wherein the silicon terminal end-blocking units have the formula

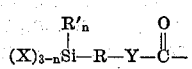

wherein X is a hydrolyzable group; wherein R is a divalent organic bridging group; wherein R' is a monovalent substituted or unsubstituted hydrocarbon radical free of aliphatic unsaturation; wherein Y is a member selected from the class consisting of (a) —NZ— wherein Z is hydrogen or a monovalent hydrocarbon radical, (b) —O—, or (c) —S—; and wherein $n$ has a value of from 0 to 2 inclusive.

Thus the method of producing the vulcanizable polymers of this invention can be graphically shown as follows:

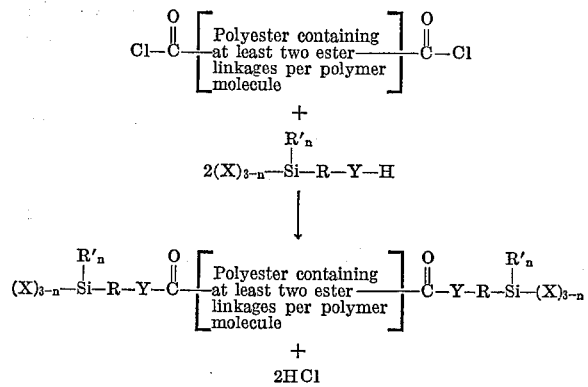

wherein X, R, R', Y and $n$ are the same as defined above. Preferably the polymer should have an average greater than two hydrolyzable end groups per polymer molecule to insure three dimensional crosslinking.

DESCRIPTION OF THE PREFERRED EMBODIMENTS

The carbonyl chloride terminated polyester prepolymers useful in the present invention are prepared by reacting a mole excess of an acid dichloride with one or more polymeric polyol or polyhydroxy ester compounds.

Illustrative acid dichlorides include for example those of the formula

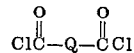

wherein Q is a divalent hydrocarbon radical having from from 1 to 20 carbon atoms.

Illustrative polymeric polyol or polyhydroxy ester compounds, include for example, polyester polyols derived from one or more lactones (hereinafter referred to as lactone polyols) and polyester polyols derived from non-cyclic mono-carboxylic acids and/or polycarboxylic acids, their anhydrides, their esters, or their halides (hereinafter referred to as non-cyclic polyester polyols).

Lactone polyols are prepared by reacting a lactone such as epsilon-caprolactone or a mixture of epsilon-caprolactone and an alkylene oxide with a polyfunctional initiator such as polyhydric alcohol, an amine or an aminoalcohol. The expression lactone polyol also includes the various ester copolymers suc has lactone copolyesters, lactone polyester/polycarbonates, lactone polyester/polyethers, lactone polyester/polyether/polycarbonates, and the like. The term lactone polyol also includes hydroxyl terminated extended lactone polyols prepared by phosgenating a lactone polyester with a polyol such as Bisphenol A, that is 2,2-bis(p-hydroxyphenyl)-propane, and the like. The above mentioned lactone polyols, their preparation and properties can be found more fully described in U.S. Pats. 2,878,236; 2,890,208; 2,933,-477–8; and 3,169,945, the disclosures of which patents are encompassed herein by reference thereto.

The term alkylene oxide as used above and herein includes for example, ethylene oxide, 1,2-epoxypropane, 1,2 - epoxybutane, 2,3-epoxybutane, isobutylene oxide, epichlorohydrin, and the like, as well as mixtures thereof.

The non-cyclic based polyester polyols are esterification products which range from liquids to non-crosslinked solids, and which are prepared by the reaction of acids and/or polycarboxylic acids, their anhydrides, their esters, or their halides, with a stoichiometric excess of a polyol. Illustrative of such carboxylic acids are for example, maleic acid, succinic acid, glutaric acid, adipic acid, pimelic acid, suberic acid, azelaic acid, sebacic acid, chlorendic acid, 1,2,4-butanetricarboxylic acid, phthalic acid, and the like, the dicarboxycyclic and tricarboxycyclic acids being the most preferred. Any polyol or mixture of polyols can be used and the esterification reaction is well documented in the art.

The most preferred polyester polyols employed in making the polymers of this invention are the lactone polyols, especially those derived from caprolactone (hereinafter referred to as caprolactone polyols).

The preferred acid dichlorides employed in making the polymers of this invention are those of having the formula

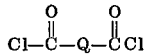

wherein Q is an arylene radical, especially phenylene, e.g., terephthalyl chloride

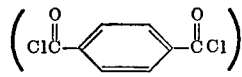

and isophthalyl chloride

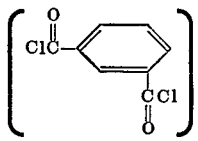

As pointed out above, to prepare the carbonyl chloride terminated polyester prepolymers useful in this invention, at least a slight mole excess of

equivalents (groups) with respect to the hydroxyl equivalents (groups) is employed to end-block the polymer chain with carbonyl chloride groups. Of course it should be understood that a single type of polyester polyol compound or mixtures of various polyester polyols can be used if desired. Furthermore, it should be clear that the backbone of the preferred carbonyl chloride terminated prepolymers comprises at least one unit and more preferably repeating units of the formula

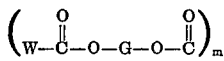

wherein G represents the residue on removal of the terminal OH groups from the polyester polyol employed; wherein W represents the divalent phenylene radical and wherein $m$ is an integer of at least one. Thus the backbone of said prepolymers is free from other types of repeating units such as urea, urethane and the like.

For the purposes of the present invention, useful carbonyl chloride terminated polyesters will have a molecular weight that is governed by their intended use. In solvent-free systems, the polymers should not be too viscous and generally have a molecular weight of from about 800 to about 20,000, preferably from about 5,000 to about 12,000. In solvent systems viscosity problems can be avoided and molecular weights greater than 20,000 can be used provided that there is a sufficient concentration of hydrolyzable end groups to form a three-dimensional, cross-linked network upon curing. Where a solvent is employed, it should be inert with respect to the polymer and volatile under the curing conditions.

The hydrolyzable silane compounds containing a reactive hydrogen atom capable of reacting with the carbonyl chloride terminal groups of the polyester prepolymer are those silanes of the formula

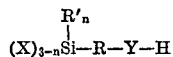

wherein $n$ has a value of 0 to 2 inclusive; YH is a functional group wherein Y is (a) —NZ— wherein Z is hydrogen or a monovalent hydrocarbon radical, (b) —O—, or (c) —S—; R is a divalent bridging group free of aliphatic unsaturation selected from the class consisting of a divalent hydrocarbon radical, a divalent hydrocarbon ether radical having not more than one ether oxygen atom attached to any one carbon atom therein, or a divalent hydrocarbon amine radical having not more than one amino group attached to any one carbon atom therein. R' is a monovalent-hydrocarbon or halohydrocarbon radical; and X is a hydrolyzable group.

Examples of the foregoing groups are as follows:

Z can be hydrogen, methyl, ethyl, propyl, butyl, octadecyl, cyclopentyl, cyclohexyl, phenyl, tolyl, benzyl and the like.

R can be alkylene such as methylene, ethylene, propylene, butylene, octadecylene and the like; cycloalkylene, such as cyclopentylene, cyclohexylene and the like; arylene such as phenylene, naphthylene and the like; alkarylene such as benzylene, 2-phenylpropylene and the like; hydrocarbon ether such as

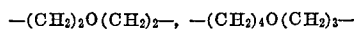

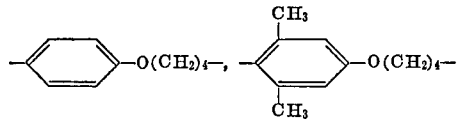

and the like; and hydrocarbon amine such as

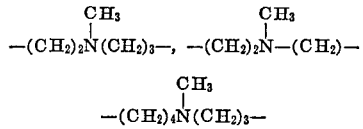

and the like.

R' can be the same hydrocarbon groups previously defined for Z and in addition the halogenated derivatives thereof such as trifluoroethyl, dibromocyclopentyl, chlorophenyl, trichlorotolyl, dichlorobenzyl, and the like.

X can be a hydrolyzable group such as halogen (e.g. fluorine, chlorine, bromine and iodine), or an organic radical which is attached to the silicon atom through a linking oxygen, sulfur or tertiary amino group such as

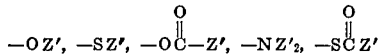

wherein Z' is a monovalent hydrocarbon radical as previously defined for Z and in addition hydrocarbon ether and thioether radicals.

The above mentioned organosilane compounds as well as methods for their preparation are well known in the art.

The preferred hydrolyzable silanes employed in the instant invention are those alkoxy silanes of the formula

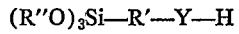

wherein R" is a lower alkyl radical of from 1 to 6 carbon atoms such as methyl, ethyl, propyl, butyl, t-butyl, pentyl, hexyl and the like; wherein R' is the same divalent bridging group as defined above and contains from 1 to 18 carbon atoms; wherein Y is a member selected from the group consisting of —S— and —NR'"— where R'" is a hydrogen or a lower alkyl radical of from 1 to 6 carbon atoms. It is to be understood that each R" may be the same or different for any given compound. The most preferred alkoxy silanes are those wherein R" is methyl, ethyl or propyl, wherein R' is a divalent lower alkylene radical of from 1 to 8 carbon atoms and wherein Y is —S—, —NH—, —NCH$_3$— or —NC$_2$H$_5$—, especially —NH—.

The vulcanizable silicon terminated polymers of this invention can be prepared by reacting about a stoichiometric amount of the hydrolyzable silane compound with the prepolymer as graphically outlined above. Thus each mole of carbonyl chloride terminated polyester prepolymer required at least two moles of hydrolyzable silane for complete reaction. Generally, it is preferred to employ at least a slight mole excess of hydrolyzable silane to insure complete reaction of all of the carbonyl chloride terminal groups present in the prepolymer. Normally the reaction is conducted in the absence of moisture and at temperatures for example, ranging from 0° C. to 50° C. or higher if desired, preferably temperatures of about 0° to about 15° C. are used with good mixing to insure good contact between the reactants. An inert diluent can be employed to facilitate the reaction if desired. An acid acceptor may also be used if desired to help remove the hydrogen chloride by-product. The resultant silicon terminated polymer can be recovered by conventional recovery procedures such as coagulation, solvent stripping and the like. While the reaction is usually conducted at atmospheric pressure, super- or sub-atmospheric pressures may also be used if desired. Of course, different types of silane compounds can be employed if desired so that the same vulcanizable polymer can be terminated with different silanes.

The most preferred vulcanizable polymers of this invention are those silicon terminated polymers having the formula

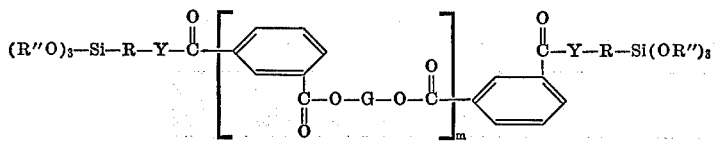

wherein R″ is a lower alkyl of from 1 to 6 carbon atoms; wherein R is a divalent alkylene radical of from 1 to 8 carbon atoms; wherein Y is —S—, —NH—, —NCH₃— or —NC₂H₅—, especially —NH—; wherein G represents the residue on removal of the terminal OH groups from a polyester polyol having a molecular weight of from about 800 to about 4000 and mixtures thereof, especially a polyester derived from caprolactone, and wherein $m$ is an integer of at least one, said silicon terminated polymers having a molecular weight of from about 1000 to about 25,000.

The polymers of this invention vulcanize or cure into a crosslinked, three-dimensional network upon exposure to moisture. The curing mechanism is believed to be operated in the following exemplified fashion: the hydrolyzable alkoxy groups are replaced with hydroxyl groups and cross-linking takes place through the condensation of pairs of SiOH groups to siloxane linkages (Si—O—Si) or by the reaction of SiOH groups with SiO-alkoxy groups to form a siloxane linkage and alcohol.

The rate of hydrolysis (cure rate) will depend on atmospheric temperature, relative humidity and the like. Thus the cure rate can be accelerated by the use of water or water vapor and/or elevated temperatures. Obviously, the vulcanizable polymers of this invention should be maintained out of contact with water (under anhydrous conditions) until actual use.

Moreover, cross-linking or curing of the instant vulcanizable polymers can be assisted and accelerated by the use of a catalyst and such is often desirable. Any well known silanol condensation catalyst may be employed for example, organic peroxides, alkyl titanates, organosilicon titanates, metal salts of carboxylic acids such as stannous octoate, dibutyltindilaurate and the like, amine salts such as dibutylamine-2-ethylhexoate and the like, or other conventional acidic and basic catalysts. When employed generally from about 25 to about 500 parts by weight of catalyst per million parts by weight of the polymer will be sufficient, of course, lower or higher amounts of catalyst may be employed. Moreover, the catalysts may be added before, during or after the preparation of the polymers.

The vulcanizable polymers of this invention can be modified by incorporating therein any of the conventional elastomer fillers, e.g. reinforcing fillers, such as fume silicas, silica aerogels and precipitated silicas of high surface area. Non-reinforcing fillers can also be used, for example, coarse silicas, such as diatomaceous earth, crushed quartz or metallic oxides such as titania, ferric oxide, zinc oxide, talc and the like. In addition, fibrous fillers such as asbestos or glass fibers or filaments may be used. In all cases it is desirable that the filler be substantially dry before admixed with the polymers. The fillers are generally used to upgrade physical properties and to modify the flow characteristics of the uncured polymer. The polymers of this invention may also contain modifiers such as resinous siloxane modifiers as plasticizers or to make the polymers more dough-like and less resilient, as well as additives such as pigments, UV absorbers, oxidation inhibitors and the like or dielectric substances such as graphite and carbon black. It is immaterial whether these fillers, modifiers or additives and the like are added to the polymers during or after the preparation as described herein. However, it is most preferable that they be added under substantially anhydrous conditions.

The vulcanizable polyester polymers of this invention are useful in coating applications as packaging films, as adhesives, and as caulks and sealants.

The instant vulcanizable polymers are unique in that they will remain stable under anhydrous storage conditions for long periods of time and their crosslink density can be controlled by choice in stoichiometry. Moreover, the crosslinked product systems are extremely tough (durable), can be oriented, and retain a modulus of several hundred pounds per square inch even at temperatures up to or above 150° C. This is surprising since by comparison polyester polyols derived from polycaprolactone, even when having molecular weights of from two to four times higher than the silicon terminated polymers of this invention lose all their strength and have about a zero modulus when heated to about 60° C. Moreover, the preferred alkoxysilane terminated polymers of this invention yield an inert by-product of alcohol upon curing and therefore prevent deleterious effects which may occur if active by-products were given off; in addition the alkoxy silicon capped polymers do not dimerize or trimerize to higher molecular weights upon storage.

The following examples are illustrative of the present invention and are not to be regarded as limiting. It is to be understood that all parts, percentages and proportions referred to herein are by weight unless otherwise indicated.

Example 1

A polycaprolactone diol (53.26 g.) of 2000 M.W. was dehydrated at 85° C./1 mm., and subsequently dissolved in 45 ml. of dichloroethane containing 6.30 g. of triethylamine. The solution was cooled to 0°–5° C. at which point a quantity of isophthalyl chloride (6.014 g.) sufficient to prepare a carbonyl chloride terminated caprolactone-isophthalate polyester of about 11,000 theoretical molecular weight was added in 15 ml. of dichloroethane. After several hours stirring at room temperature, 1.8033 g. of aminopropyltrimethoxysilane was added from an addition funnel, and the funnel was rinsed with dichloroethane. The mixture was allowed to stir for about two hours, after which the solution was pressure filtered to remove triethylamine hydrochloride. Solvent stripping yielded a silane terminated polyester polymer with a reduced viscosity of 0.61 (0.23 g./100 ml. CHCl₃ at 25° C.). The polymer was reversibly crystalline, solution cast films rapidly crystallized on solvent evaporation. Exposure of the films to atmospheric moisture for one day resulted in crosslinking as judged by the insolubility of the film in chloroform; i.e., the film was swelled but not dissolved after standing in CHCl₃ for fifteen minutes, after which time it could be removed intact.

Example 2

The above procedure in Example 1 was repeated but the stoichiometry was modified so that the isophthalate chloride terminated prepolymer had a theoretical molecular weight of 22,000. The reduced viscosity, of the vulcanizable silane terminated polyester polymer prior to crosslinking was 0.97 (0.23 g./100 ml. of CHCl₃ at 25° C.).

Table I summarizes the physical properties of the cured films prepared from the silane terminated polyester polymers of Examples 1 and 2 and compares them with an unmodified isophthalate chloride terminated polyester polymer.

wherein the silicon terminal endblocking units have the formula

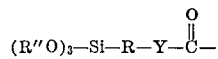

wherein R″ is a lower alkyl radical of from 1 to 6 carbon atoms, wherein R is a divalent bridging group free of aliphatic unsaturation selected from the group consisting of a divalent hydrocarbon radical, a divalent hydrocarbon ether radical having not more than one ether oxygen attached to any one carbon atom therein and a divalent hydrocarbon amino radical having not more than one amino group attached to any one carbon atom therein, said bridging group having from 1 to 18 carbon atoms; and wherein Y is a member selected from the group consisting of —S— and —NR‴— where R‴ is hydrogen or a lower alkyl radical of from 1 to 6 carbon atoms and wherein the polyester moiety is free from urea and urethane units and is the residue on removal of the terminal

TABLE I

| Sample | Reduced viscosity prior to vulcanization | Percent silane | $T_2$, °C. | Flow, °C. | T.M., p.s.i. | 100% mod., p.s.i. | 300% mod., p.s.i. | T.S., p.s.i. | Percent elong. at break |
|---|---|---|---|---|---|---|---|---|---|
| Unmodified* caprolactone-isophthalate | *3.70 | None | 50 | 160 | 22,600 | 920 | 1,040 | 3,100 | 880 |
| Example I | 0.61 | 3 | 230 | None | 15,300 | 940 | 1,600 | 2,200 | 280–450 |
| Example II | 0.97 | 1.5 | 190 | 260 | 25,400 | 1,040 | 1,140 | 3,900 | 750 |

*A high molecular weight isophthalyl chloride terminated caprolactone polyester having no silane. This product, despite the high molecular weight, lost all strength when heated above 50° C.

Example 3

Other vulcanizable silicon terminated polyester polymers can be prepared by replacing the hydrolyzable silane used in Example 1 above and reacting an isophthalyl chloride terminated polycaprolactone prepolymer with a slight mole excess of silanes such as

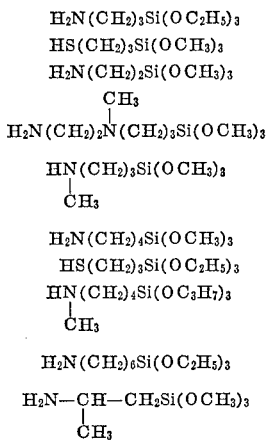

and the like.

Various modifications of this invention will be obvious to a worker skilled in the art and it is understood that such modifications and variations are to be included within the purview of this application and the spirit and scope of the claims.

What is claimed is:

1. A vulcanizable silicon terminated organic polyester having at least two ester linkages per polymer molecule hydroxy groups from a polyester polyol selected from the group consisting of lactone polyols and polyester polyols of non-cyclic carboxylic acids, their anhydrides, their esters or their halides, said residue being bonded to a divalent hydrocarbon radical having from 1 to 20 carbon atoms through ester bridging groups of the formula

wherein the free valent

group is directly bonded to a carbon atom of said divalent hydrocarbon radical and wherein the free valent oxygen atom of said bridging groups is directly bonded to a carbon atom of said residue.

2. A vulcanizable polymer as defined in claim 1, wherein the polyester moiety is the residue on removal of the terminal hydroxy groups from a lactone polyol said residue being bonded to a phenylene radical through ester bridging groups of the formula

wherein the free valent

group is directly bonded to carbon atom of said phenylene radical and wherein the free valent oxygen atom of said bridging groups is directly bonded to a carbon atom of said residue.

3. A vulcanizable silicon terminated organic polyester polymer having the general formula

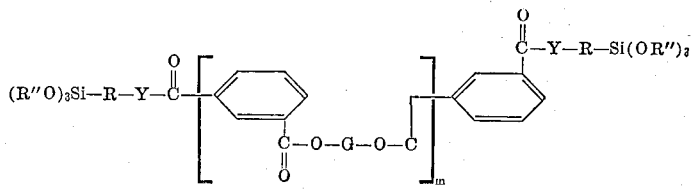

wherein R" is a lower alkyl radical of from 1 to 6 carbon atoms, wherein R is a divalent alkylene radical of from 1 to 8 carbon atoms; wherein Y is a member selected from the group consisting of —S—, —NH—, $NCH_3$—, —$NC_2H_5$—; wherein G represents the residue on removal of the terminal hydroxy groups from a polycaprolactone diol having a molecular weight of from about 800 to about 4,000 or mixtures thereof and wherein $m$ is an integer of at least 1, said silicon terminated polymers having a molecular weight of from about 1,000 to about 25,000.

4. A polymer as defined in claim 3 wherein R" is methyl or ethyl and Y is —NH—.

5. The cured crosslinked polymer of claim 1, obtained upon exposure of the vulcanizable polymer to moisture.

6. The cured crosslinked polymer of claim 2, obtained upon exposure of the vulcanizable polymer to moisture.

7. The cured crosslinked polymer of claim 3, obtained upon exposure of the vulcanizable polymer to moisture.

8. The cured crosslinked polymer of claim 4, obtained upon exposure of the vulcanizable polymer to moisture.

References Cited

UNITED STATES PATENTS 2,877,202    3/1959    Olson ............... 260—75

OTHER REFERENCES

Chem. Abstracts 65, 9111h (1966).

WILLIAM H. SHORT, Primary Examiner

E. A. NIELSEN, Assistant Examiner

U.S. Cl. X.R.

260—46.5 E, 46.5 Y, 46.5 G, 78.3 R

PO-1050
(5/69)

UNITED STATES PATENT OFFICE
CERTIFICATE OF CORRECTION

Patent No. 3,678,010      Dated July 18, 1972

Inventor(s) George L. Brode

It is certified that error appears in the above-identified patent and that said Letters Patent are hereby corrected as shown below:

Claim 3, line 3 (counting the complete formula as line 3) that portion of the formula shown as "-O-C⌐" should read --- -O-C⌐ with ‖ and O below ---.

Signed and sealed this 19th day of December 1972.

(SEAL)
Attest:

EDWARD M. FLETCHER, JR.             ROBERT GOTTSCHALK
Attesting Officer                   Commissioner of Patents